United States Patent [19]

Guido et al.

[11] Patent Number: 4,669,156
[45] Date of Patent: Jun. 2, 1987

[54] PIPE CLIP OF RESILIENT MATERIAL

[76] Inventors: Jürgen Guido, Borsig-Strasse 4; Norbert Binzer, Röntgen-Strasse 54, both of D-8402 Neutraubling, Fed. Rep. of Germany

[21] Appl. No.: 795,996

[22] Filed: Nov. 6, 1985

[30] Foreign Application Priority Data

Nov. 12, 1984 [DE] Fed. Rep. of Germany ....... 3441302

[51] Int. Cl.$^4$ ............................................. B65D 67/02
[52] U.S. Cl. ....................................... 24/336; 24/297; 24/335; 24/338; 248/74.3
[58] Field of Search ................. 24/335, 336, 337, 338, 24/297; 248/74.3

[56] References Cited

U.S. PATENT DOCUMENTS

| 3,626,553 | 12/1971 | Darney | 24/336 |
| 4,083,523 | 4/1978 | Fisher | 248/74.3 |
| 4,121,798 | 10/1978 | Schumacher et al. | 24/336 |
| 4,148,113 | 4/1979 | Dvorachek | 24/335 |
| 4,564,163 | 1/1986 | Barnett | 24/297 |

FOREIGN PATENT DOCUMENTS

2329563 1/1975 Fed. Rep. of Germany ..... 248/74.3

Primary Examiner—Victor N. Sakran
Attorney, Agent, or Firm—Baker, Maxham & Jester

[57] ABSTRACT

A pipe clip comprising resilient material which comprises a mounting portion (1) with at least two clamps (3, 4) having clamping limb portions (3a, 3b; 4a, 4b) which can be resiliently spread open for the insertion of conduits (2), the clamps being adapted to the conduit cross-section. The clip has at least one stirrup portion (6) which engages over the clamps and which in its closed position snaps, with inner catches (7a, 9a) disposed on its two elastically spreadable limbs (7, 9), behind associated catches (3d, 4d) on the two mutually oppositely disposed outermost clamping limb portions (3a, 4b) of clamps (3, 4) which are arranged in side-by-side relationship in one plane. The stirrup portion is provided at each intermediate space between two clamps which are covered over thereby in the closed position thereof, with a bar portion (12) which in the closed position engages between said clamps and thereby resiliently spreads apart the two clamping limb portions (3b, 4a) which are most closely adjacent thereto. The pipe clip is improved to provide a reliably firm clamping action for the conduits (2), in that the outer regions of the clamping limb portions of each clamp (3, 4) are provided at their free ends with flat outside surfaces (3'a, 3'b) and (4'a, 4'b) which converge in an outward direction. The stirrup portion (6) comprises, as the or each bar portion, a respective taper portion (12) which is yielding in the closing direction and which is associated with a taper opening included between the adjacent clamping limb portions (3b, 4a). The stirrup portion (6), on its two limbs (7, 9), has contact surfaces (7b, 9b) which in the closed position co-operate with the associated outside surfaces (3'a, 4'b) of the most closely adjacent clamping limb portions (3a, 4b).

19 Claims, 10 Drawing Figures

Fig.10 though there may be tolerances in the diameters of the conduits and the recesses which are provided for the conduits in the pipe clip.

PIPE CLIP OF RESILIENT MATERIAL

BACKGROUND OF THE INVENTION

A pipe clip of plastic material, for example as disclosed in German patent specification No. 2 306 969, comprises a mounting portion carrying two clamps for the conduits, and a stirrup portion which fits over the clamps and which has a bar portion engaging therebetween. The free ends of the limb portions of the clamps are increased in thickness outwardly in a bead-like configuration, and the generally U-shaped stirrup portion has catches on the insides of its two limbs, which engage behind the beads on the two outermost limb portions of the clamps; the stirrup portion also has catches which are disposed in opposite relationship on its bar portion and which engage behind the outer beads on the two clamp limb portions which are towards the bar portion, to provide a snap-type closure. While that arrangement provides that the stirrup portion is adequately fixed to the mounting portion, nonetheless a snap-type closure arrangement of that kind also has the result that the clamping effect for clamping the conduits or pipes which are to be fixed in the clamps is smaller when the stirrup portion is fitted into position, than while the stirrup portion is being fitted. Particularly under disadvantageous operating conditions, for example when dealing with sets of injection conduits or pipes, which are to be held together by the pipe clips, between an injection pump and the associated injection nozzles of a diesel engine or other fuel-injection engine, vibration and elevated temperatures may occur, which make it impossible to use a soft-elastic plastic material. If however a correspondingly hard plastic material is employed in order to avoid the above-mentioned disadvantage, then the permanent clamping action which can be produced by the above snap-type closure arrangements is no longer adequate reliably to hold the conduits in position in the desired manner, having regard to tolerances in respect of diameters, both on the conduits to be clamped and also on the clamps of the pipe clip. The pipe clips can slip out of the positions in which they are intended to be disposed, and may lose their desired clamping effect.

When pipe clips are used on injection conduits of internal combustion engines, it is also important for the injection conduits to be reliably clamped at the pipe clip, in such a way as to prevent them from slipping or turning, for the reason that the pipe clips are also employed, before the injection conduits are mounted to the internal combustion engine, to connect the injection conduits together in sets, with the injection conduits already being prebent into the configuration corresponding to the way in which they will be subsequently fitted to the internal combustion engine. In that way, an entire set of injection conduits is taken to the point of mounting thereof, in the form of an assembled unit, so that, at the point of mounting, the injection conduits can be connected to an associated injection pump and to the associated injection nozzles on the engine, by way of the connecting nipples at the ends of the conduits and suitable cap nuts, without the need for further work in matching the conduits to their condition of installation. That simplified method of connecting the conduits in position should also be retained if, after a prolonged period of operation of the internal combustion engine, the injection conduits have to be temporarily removed for any reason.

Because of the above-indicated difficulties, metal pipe clips are also used nowadays on fuel-injection internal combustion engines. The conduits which are to be fixed in position are surrounded at each pipe clip by a rubber member which is more or less softly elastic and which compensates for tolerances. The conduits are clamped in position by way of clamping screws which fix the stirrup portion to the mounting portion, which is thus a comparatively expensive way of fixing the conduits.

SUMMARY OF THE INVENTION

An object of this my invention is to provide a pipe clip which securely clamps conduits in position.

Another object is to provide a pipe clip for fixing conduits in such a way that, even with normal production tolerances, as in the outside diameters of the conduits and the recesses defined by the clamps for the conduits in the pipe clips, and with vibration as well as operating temperatures of up to about 100° C., the conduits can be secured in place over a long period of time.

A further object is a pipe clip which does not require additional cushioning members for holding conduits in such a way that, in spite of loadings which occur in operation of the clip there is no need to fear that conduits and pipe clip may slip relative to each other or conduits may spontaneously turn in the pipe clip.

These and other objects are achieved by the pipe clip claimed herein.

With the defined configuration of the clamping limb portions on the clamps of the mounting portion and the configuration of the stirrup portion, the parts which co-operate with the outer inclined surfaces of the clamping limb portions, in particular the taper portion or portions on the stirrup portion, may easily be of such dimensions that, when the pipe clip is in a closed condition, the stirrup portion and the taper portion or portions are operable to produce a wedging force against the clamping limb portions of the clamps, and that force always remains effective, while the wedging force, even without the use of additional rubber members on the co-operating parts, can compensate for any positional and production tolerances that may occur, even when the material used for the pipe clip is a more or less hard-elastic material which is resistant to elevated temperatures.

An advantageous embodiment of the invention is set forth in appended claim 2. The material of the pipe clip makes it possible at the same time to form therefrom flat spring portions which act as a leaf spring and by means of which the or each taper portion is reliably pressed into position between the clamps, even over longer travel strokes.

A further advantageous embodiment is set forth in appended claim 5, the taper openings and taper portions thereof providing that substantially the same predetermined clamping force always acts on the conduits to be clamped in position, even when the diameters thereof reach their tolerance limits in opposite directions. Uniform clamping of the conduits in that way also makes it possible to absorb or cushion any relative shifts in the conduit positions, which occur for example due to external forces while the conduits are being fitted into their operating positions, without the conduits slipping in the pipe clip. For example, relative shifts in position of the conduits, as referred to above, may occur on pre-bent injection conduits which are held together as a set by way of a pipe clip, as in regard to the different pre-formed curvatures required for the individual conduits, it is also necessary to accept certain tolerances within which, after the conduits have been connected to the pipe clips, the clamped conduits may be subject to different lateral stresses and may therefore experience shifts in position relative to each other as a result.

Further objects, features and advantages of the invention will become apparent from the following description.

DESCRIPTION OF PREFERRED EMBODIMENTS

Figure 1:
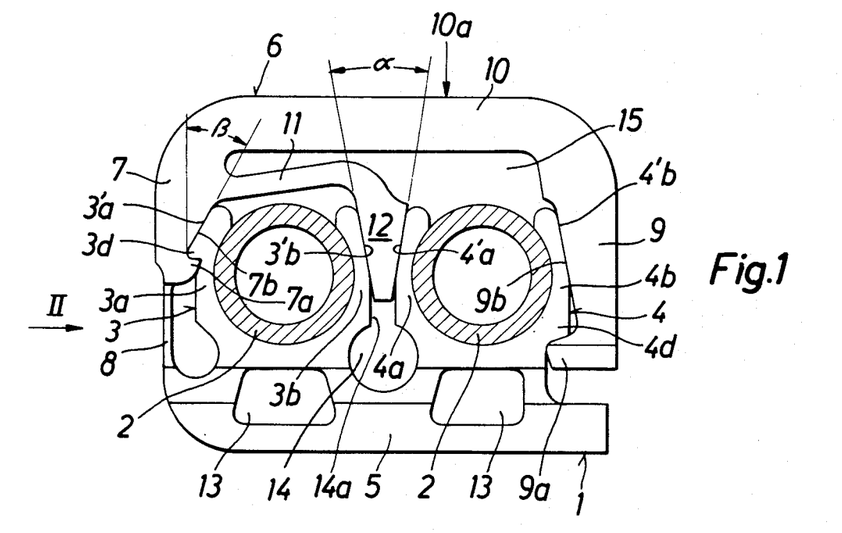
FIG. 1 is a side view of a first embodiment of the pipe clip in the closed condition.
Figure 2:
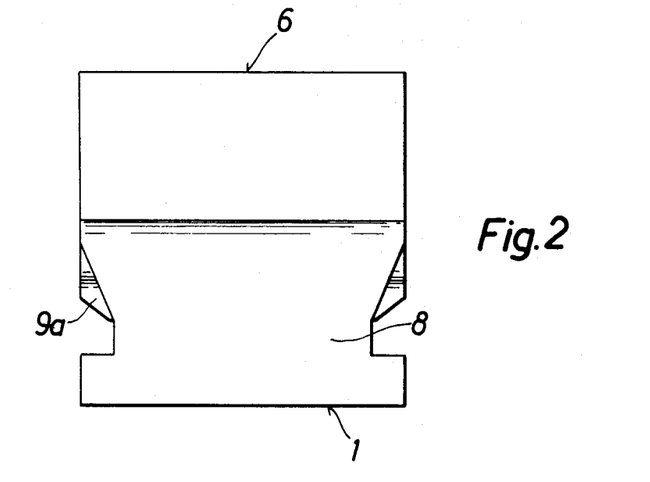
FIG. 2 shows another side view of the pipe clip of FIG. 1, viewing in the direction of the arrow II therein.
Figure 3:
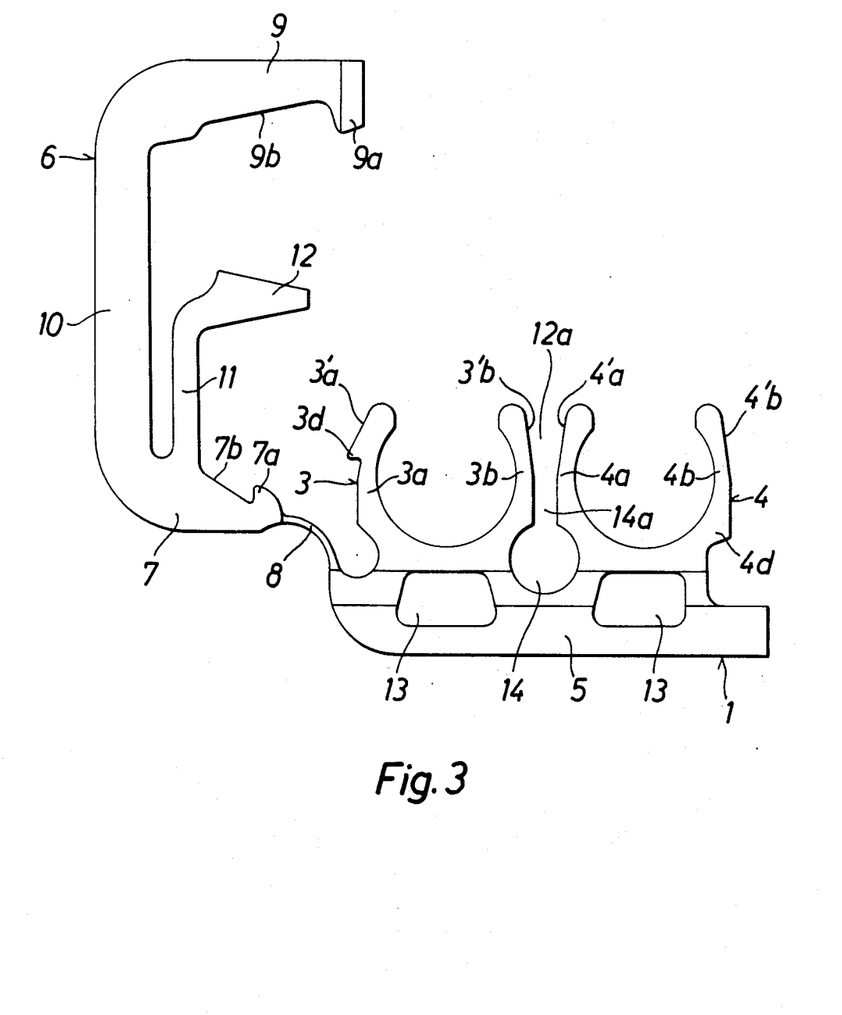
FIG. 3 is a side view which is the same as that shown in FIG. 1, but with the pipe clip in the open condition.

The pipe clip which is shown in FIGS. 1 to 3 and which corresponds to the first embodiment of the invention, for fixing relative to each other conduits which are disposed in side-by-side relationship, in particular injection conduits on internal combustion engines, is produced from a commercially available hard-elastic plastic material which is as far as possible resistant to temperature, for example a polyamide. The illustrated pipe clip comprises a mounting portion 1 having two clamps 3 and 4 which are used for introducing a respective conduit 2 therein and which project upwardly in juxtaposed relationship from a base plate 5 of the mounting portion 1, and a generally U-shaped loop or stirrup portion 6. At its one limb 7 which is on the left in FIG. 1, the stirrup portion 6 is connected by way of a film hinge 8 to the end of the base plate 5 of the mounting portion 1, that is on the left in FIG. 1.

The clamps 3 and 4 have clamping limb portions 3a, 3b and 4a, 4b which can be elastically spread open. The outer regions of each of the clamping limb portions 3a, 3b and 4a, 4b of each clamp have respective convergent flat outside surfaces 3'a, 3'b and 4'a, 4'b. As shown in FIG. 1, when the pipe clip is in the closed position, the stirrup portion 6 engages with inward barbs or catches 7a and 9a provided on its two limbs 7 and 9 which can be resiliently spread apart, behind associated barbs or catches 3d and 4d on the two mutually oppositely disposed outermost clamping limb portions 3a and 4b of the clamps 3 and 4. In that way, when the stirrup portion 6 is pivoted downwardly on to the mounting portion 1, after the limbs 7 and 9 of the stirrup portion 6 have been correspondingly resiliently spread apart, the catches 7a and 9a on the stirrup portion 6 come into snap engagement behind the catches 3d and 4d on the outermost clamping limb portions 3a and 4b, so that the closed pipe clip is reliably held in its closed position.

As FIG. 1 also shows, on its two limbs 7 and 9, between the locations at which the limbs 7 and 9 are respectively connected to the central web portion 10 of the stirrup portion 6 and the respective catches 7a and 9a thereon, the stirrup portion has contact surfaces 7b and 9b respectively; the contact surfaces 7b and 9b extend in an inclined position, being adapted to the associated outside surfaces 3'a and 4'b of the adjacent clamping limb portions 3a and 4b, when the stirrup portion is in its closed position. While a taper or wedge angle α of 20° is included between the mutually adjacent clamping limb portions 3b and 4a of the adjacent clamps 3 and 4, the angle of inclination β of the contact surface 7b of the limb 7 which is connected to the mounting portion 1 by way of the film hinge 8, and therewith the same angle of inclination of the outside surface 3'a of the adjacent clamping limb portion 3a relative to a line perpendicular to the support surface of the base plate 5 of the mounting portion 1, are 30°. It will also be seen from FIGS. 1 and 3 that, as shown in FIG. 1, a leaf or flat spring 11 extends from the left-hand limb 7 of the stirrup portion 6, at the inside thereof, at a small spacing from the central web portion 10. The spring 11 extends substantially parallel to the central web portion 10 and is extended to a position above the taper opening between the two middle clamping limb portions 3b and 4a of the clamps 3 and 4; at that location, the spring 11 merges into a wedge or taper portion 12 which fills up the taper opening. The spring 11 and the taper portion 12 are bent relative to each other approximately through a right angle. Comparison between FIGS. 1 and 3 shows that the spring 11 extends parallel to the central web portion 10 when the stirrup portion 6 is opened and the spring is thus correspondingly relieved of stress, while as shown in FIG. 1, when the pipe clip is in a closed condition and the taper portion 12 is pressed against the clamping limb portions 3b and 4a, the spring 11 is deflected through a few degrees of angle towards the central web portion 10, when considering the spring 11 from the point at which it is connected to the limb 7 of the stirrup portion 6 towards the taper portion 12. That resilient deflection of the spring 11 in the closed condition of the pipe clip provides that the taper portion is constantly biased into the associated taper opening, with a wedge force which corresponds to the resilient deflection of the spring 11.

While, when the pipe clip is in a closed condition, the limbs 7 and 9 of the stirrup portion can provide that the two outermost clamping limb portions 3a and 4b of the two clamps 3 and 4 are constantly stressed towards each other with a force of the order of magnitude of about 50 kg, the taper portion 12 which is biased into the taper opening in the above-indicated manner can still produce a wedge force acting into the taper opening of about 5 kg, even when the pipe clip is at a temperature of about 100° C.; that means that the conduits 2 which are thereby clamped in the clamps 3 and 4 remain reliably non-slippingly connected to the pipe clip, even in the event of unfavourable tolerance deviations as between the outside diameters of the conduits 2 and the openings defined by the clamps 3 and 4.

It will further be seen from FIGS. 1 and 3 that, at the base of each clamp 3 and 4 respectively, the mounting portion 1 has respective openings 13 and 14. The openings 13 impart to the bottom region of each clamp, a wall thickness which is similar to the outer regions of the clamping limb portions, while the opening 14 imparts to the walls of the adjacent clamping limb portions 3b and 4a, at the base of the taper opening 12a, a wall thickness which is similar to the outer regions of the clamping limb portions. The taper opening 12a communicates with the opening 14 by way of a gap 14a which remains between the adjacent clamping limb portions 3b and 4a and which is of uniform width when the clip is in the open position as shown in FIG. 3.

As the spring 11 only extends over the clamp 3 which is shown on the left in FIG. 1, a comparatively large hollow space 15 remains above the clamp 4 which is towards the free limb 9 of the stirrup portion 6. So that the stirrup portion 6 can be pivoted away from the mounting portion 1 in order to open the pipe clip, if possible also without using a tool, and as for that purpose the outer limb 9 of the stirrup portion can firstly be pivoted away from the catch 4d disposed on the outer clamping limb portion 4b of the adjacent clamp 4, it is only necessary to apply a suitable pressure force to the central web portion 10 above the hollow space 15, in the direction indicated by the arrow 10a; by virtue of that force, the outer limb 9 of the stirrup portion is pivoted away from the clamp 4 of the pipe clip until the catch 4d is released, whereupon, for example by inserting any suitable article, for example the shaft of a small screwdriver, between the limb 9 of the stirrup portion 6 and the adjacent clamping limb portion 4b, the limb 9 of the stirrup portion 6 is prevented from snapping back into the closure position, and the stirrup portion 6 can thus be pivoted upwardly away from the mounting portion 1.

Figure 4:
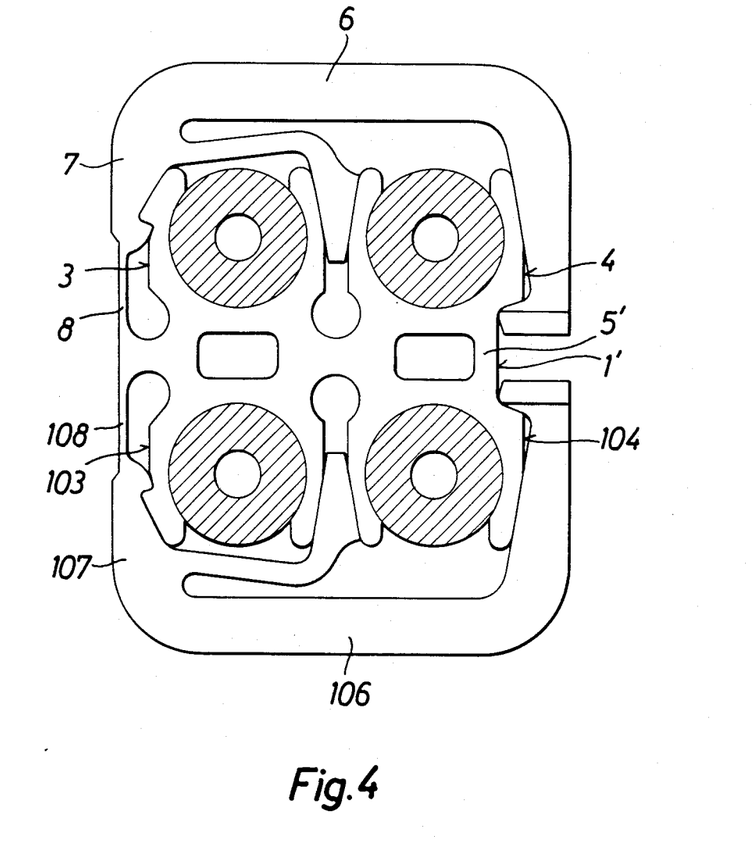
FIGS. 4 and 5 are side views corresponding to that shown in FIG. 1, of second and third embodiments respectively of the pipe clip.

The pipe clip shown in FIG. 4, which corresponds to the second embodiment, is provided for fixing relative to each other four conduits which in this case extend in pairs in two mutually parallel planes. Accordingly, instead of a base plate, the mounting portion 1' has an intermediate wall 5' with clamps 3, 4 and 103, 104 which project on respective sides in mirror image relative to the central plane thereof, together with two stirrup portions 6 and 106, each of which is associated with one of the two oppositely disposed rows of openings defined by the clamps. In addition, this embodiment has two film hinges 8 and 108 which extend from the intermediate wall 5'. The upper film hinge 8, as in the above-described embodiment, goes into the left-hand limb 7 of the upper stirrup portion 6, while the lower film hinge 108 goes into the left-hand limb 107 of the lower stirrup portion 106.

Figure 5:
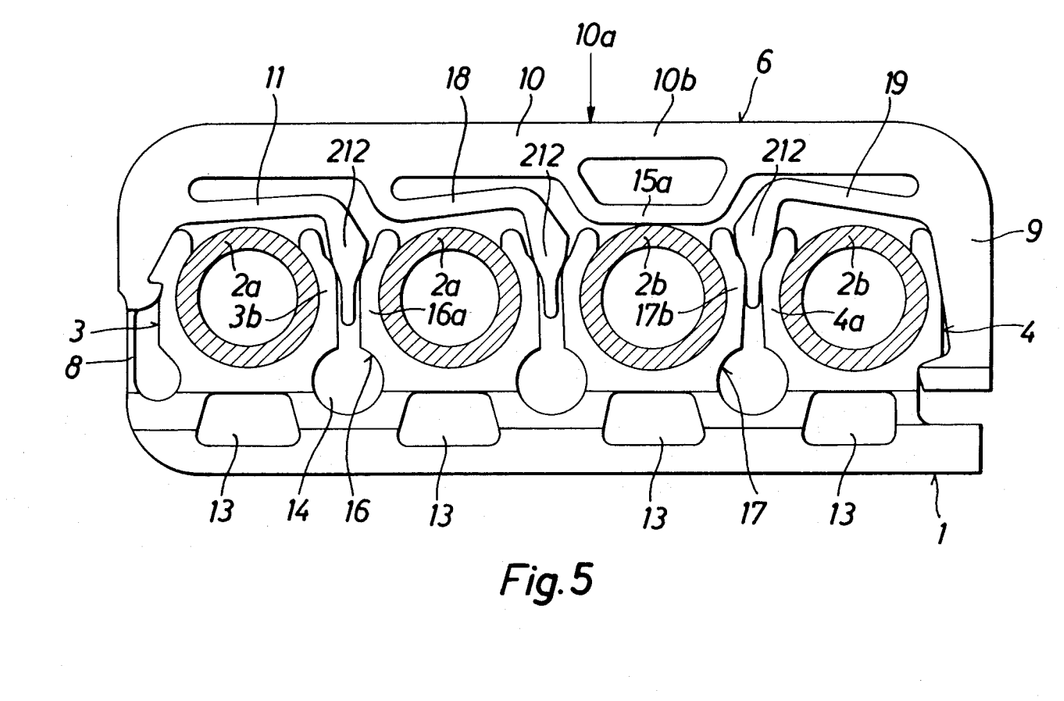
Figure 6:
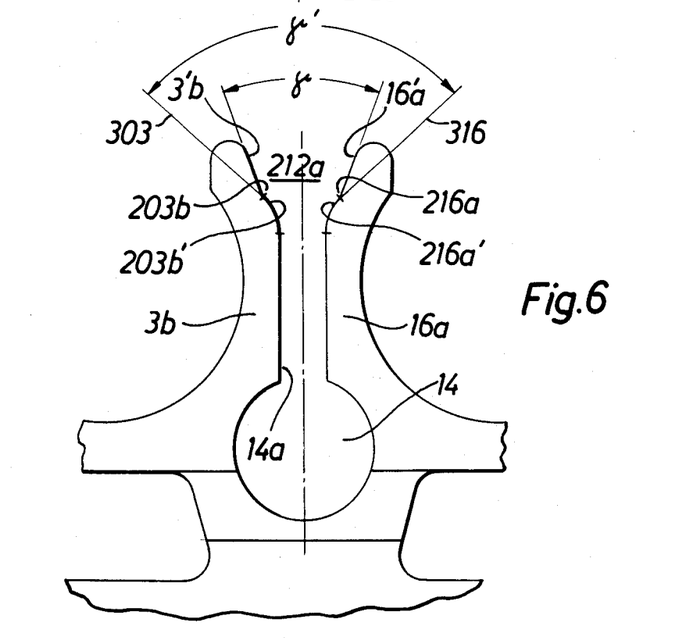
FIG. 6 is a view on an enlarged scale of part of the construction shown in FIG. 5, illustrating two clamping limb portions, which form a taper opening therebetween, of adjacent clamps of the pipe clip shown in FIG. 5.
Figure 7:
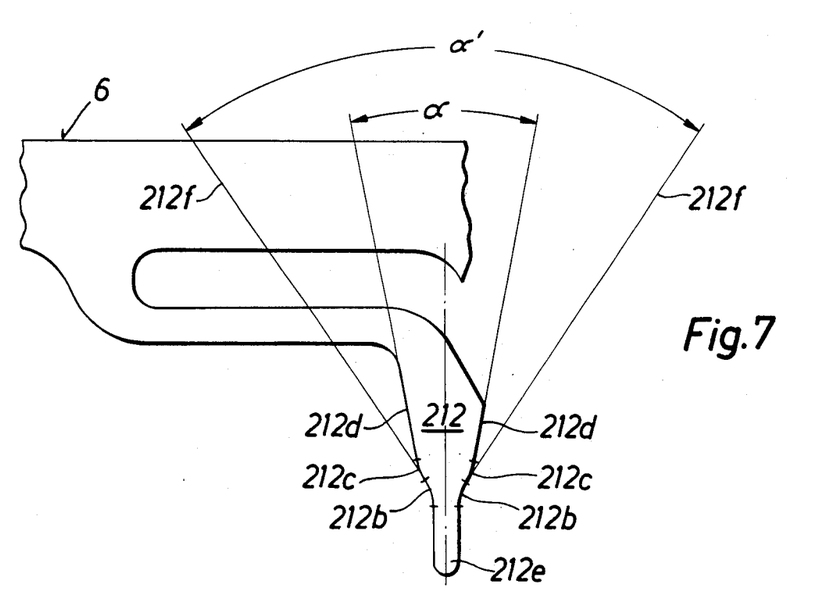
FIG. 7 is another view on an enlarged scale of part of the construction shown in FIG. 5, illustrating a taper portion of the pipe clip of FIG. 5.

The pipe clip shown in FIGS. 5, 6 and 7, corresponding to the third embodiment and also comprising a hard-elastic plastic material also serves for fixing relative to each other four conduits which in this case however extend in juxtaposed relationship in a single plane. In comparison with the first embodiment, this construction also has two further clamps 16 and 17 between the clamps 3 and 4 which now constitute the outer clamps of this arrangement. Associated with the clamps are three wedge or taper portions 212. The taper portion which is shown at the left is carried on the flat or leaf spring 11 while the other taper portions which are disposed to the right of the left-hand taper portion are each carried on a respective flat or leaf spring 18 and 19. Another important difference between this embodiment and the embodiments described above is that all clamping limb portions which between them form a taper opening 212a (see for example FIG. 6), being for example the clamping limb portions 3b and 16a in FIG. 6, of all four clamps 3, 16, 17 and 4, and, as shown in FIG. 7, also the associated taper portions 212, are of a configuration which is modified in comparison with the embodiments described hereinbefore. The modified configuration will be described hereinafter with reference to FIGS. 6 and 7 and will be described in regard to its mode of operation, with reference to FIG. 5 and FIGS. 8 to 10. In addition, in its region which is free of leaf or flat springs on its inside, the stirrup portion 6 has a region 10b of reduced wall thickness which, at its inside, is bridged across at a spacing therefrom by a web portion 15a which is even thinner than the region 10b. That configuration of the central web portion 10 provides for an effective pivotal opening movement of the outer limb 9 of the stirrup portion when a suitable pressure is applied to the region 10b of the stirrup portion 6, when the pipe clip is in a closed position.

In relation to the taper shapes and taper openings 12a of the embodiments shown in FIGS. 1 to 4, there is still an unsatisfactory aspect in that, when used in relation to conduits 2 of different outside diameters, even if they are still within the permitted tolerance range of from example 0.4 mm, the conduits 2 are subjected to different clamping forces by virtue of the fact that, as a result of the differences in diameters of the conduits 2, the taper portions 12 penetrate into the taper openings 12a to different depths and the springs 11 have correspondingly different spring movements. If the conduits 2 are of small outside diameter and the associated springs 11 perform correspondingly small spring movements from their starting position in which they are relieved of stress, the above-mentioned differences in the clamping forces applied to the conduits 2 can result in the clamping forces being undesirably weak. That deficiency is effectively countered by the configuration, which is described hereinafter in greater detail, for the taper portions 212 and the taper openings 212a of the third embodiment, wherein the taper openings 212a and the taper portions 212 are of the shapes set forth in the following paragraphs (a) to (e):

(a) between the flat outside surfaces 3'b and 16'a of the adjoining clamping limb portions 3b and 16a, each taper opening 212a has an aperture angle γ in the region of 40°;

(b) the inner ends of the flat outside surfaces 3'b and 16'a merge, by way of a respective concave curvature portion 203b and 216a and an adjoining convex curvature portion 203b' and 216a', into the gap 14a between the adjacent clamps 3 and 16;

(c) the respective tangents 303 and 316 at the points of reversal of the mutually opposite curvature portions 203b and 203b', 216a and 216a', include an aperture angle γ' in the region of 95°;

(d) each associated taper portion 212 goes from a projection portion 212e which is narrower than the gap 14a, by way of a respective concave curvature portion 212b and an adjoining convex curvature portion 212c, into its two taper surfaces 212d which include a taper or wedge angle α in the region of 22°; and (e) the tangents 212f at the points of reversal of the last-mentioned mutually opposite curvature portions 212b and 212c include an aperture angle α' in the region of 70°.

Figure 8:
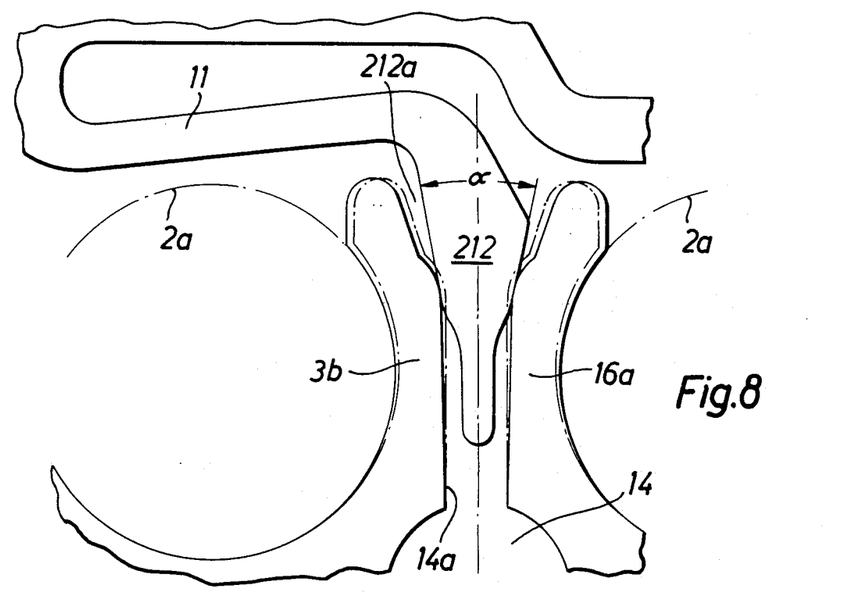
FIG. 8 is an enlarged view of part of the construction shown in FIG. 5, in the region of the left-hand taper portion between two conduits with a diameter which is at the lower tolerance limit.
Figure 9:
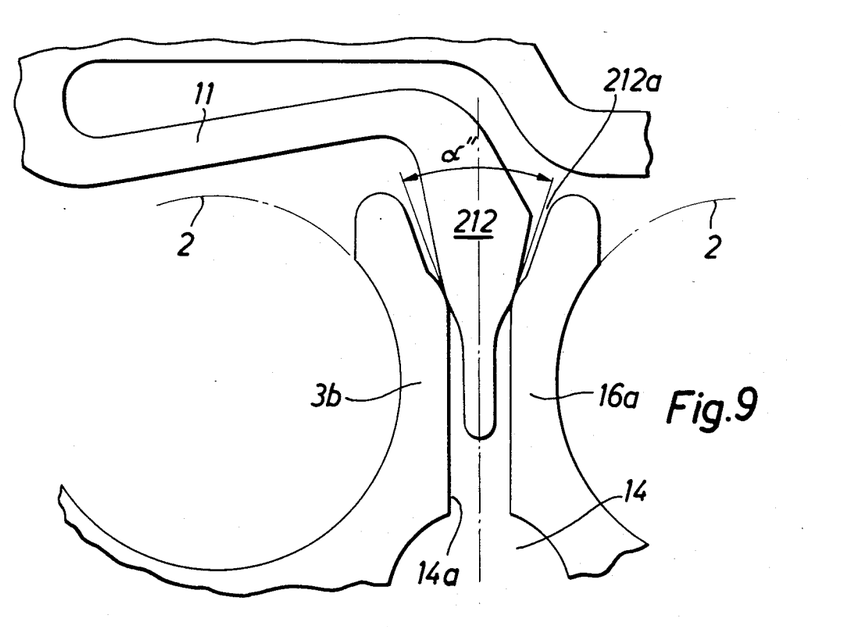
FIG. 9 is a view of the same portion of the construction as shown in FIG. 8, but with pipe conduits with a nominal diameter.
Figure 10:
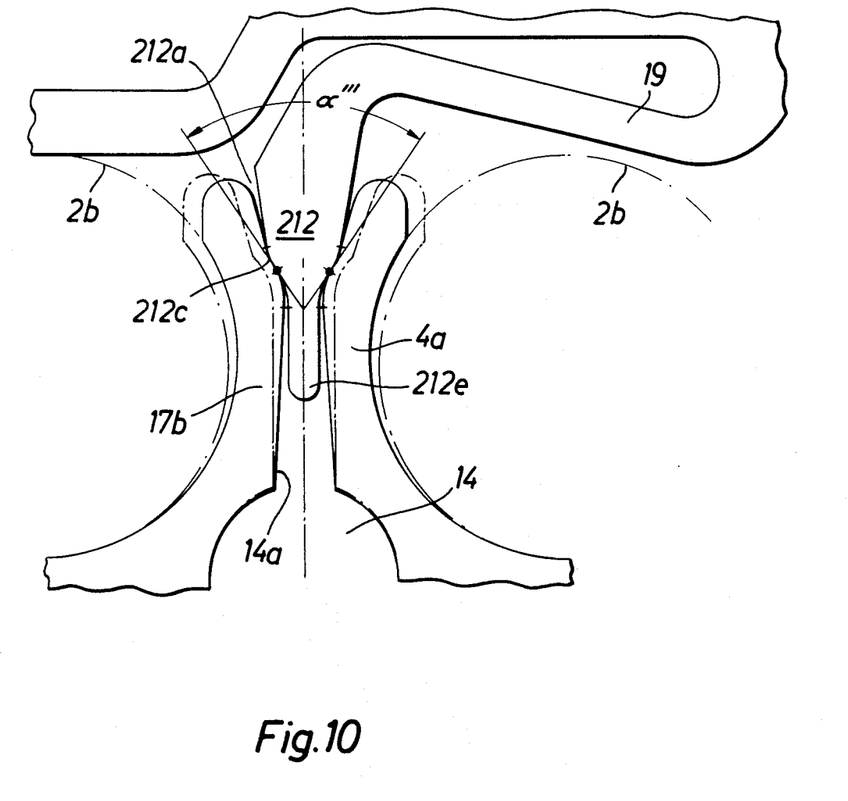
FIG. 10 is a view on an enlarged scale of a part of the construction shown in FIG. 5, in the region of the right-hand taper portion between two conduits with a diameter at the upper tolerance limit.

In the case of the pipe clip shown in FIG. 5, conduits are shown with outside diameters which differ within the permitted tolerance; the two conduits shown on the left, which have the smallest admissible outside diameter, are denoted by reference 2a while the two conduits on the right, which have the maximum admissible outside diameter, are denoted by reference 2b. Accordingly, there are correspondingly different positions as between the left-hand taper portion 212 which engages between the clamps 3 and 16, and the right-hand taper portion 212 which engages between the two clamps 17 and 4, while the middle taper portion 212 which engages between the clamps 16 and 17 takes up a central position. In spite of that, the result of the configuration of the taper openings 212a and the taper portions 212, as described in greater detail with reference to FIGS. 6 and 7, is that approximately equal clamping forces are applied to all conduits 2a and 2b. The reason for that is that the taper portion 212 which, in relation to the left-hand conduits 2a, engages between the two clamps 3 and 16 to a greater depth into the taper opening 212a therebetween, bears against the clamping limb portions 3b and 16a, as shown in FIG. 8, in a region in which there is only a small taper angle α of 22°, thereby producing, at the clamping limb portions 3b and 16a, in spite of the spring travel of the leaf spring 11 being only short, the same clamping force as at clamping limb portions 3b and 16a disposed, as shown in FIG. 9, between conduits 2 with a diameter which is in the middle of the tolerance range, with the spring 11 having a medium spring travel and with the taper portion 212 bearing against the clamping limb portions 3b and 16a at the point at which the taper angle α" is 40°, and also at the clamping limb portions 17b and 4a of the two clamps 17 and 4, which are disposed between the conduits 2b as shown in FIG. 10, being the location where the taper portion 212 which has the smallest depth of engagement into the taper opening 212a at that point results in an even greater spring travel and thus an even greater spring force. The reason for the clamping force being the same even with the largest diameter of the conduits 2b is that in that case the taper portion 212 is supported against the clamping limb portions 17b and 4a, by way of a part of its surface which is in the region of its curvature portions 212c, where the taper angle α''' is substantially greater than 22°, being 70°, so that that larger taper angle can only transmit the greater spring force of the spring 19 to the two clamping limb portions 17b and 4a, in the form of a correspondingly reduced clamping force.

Plastic material may be advantageous as the material for the pipe clip, for many situations of use, while in a situation which at the same time involves a thermal loading, it may be desirable for example to use a polyamide which in particular is reinforced with glass fibre, even if a suitable light metal alloy and in particular a magnesium alloy which has been subjected to a refining or age-hardening treatment may be desirable in particular when the situation of use involves higher temperature loadings.

The value of the taper angle α of the taper portions 12 or between the flat taper surfaces 212d of the taper portions 212 with a variable taper angle, instead of being precisely 20° or 22°, could also lie in the range of from 19° to 23° or at any event in a range of from 10° to 30°, while the pipe clip could also have three or more than four clamps, in an arrangement which is analogous to the specific embodiments described.

What is claimed is:

1. A pipe clip of resilient material for fixing relative to each other at least first and second conduits extending in juxtaposed relationship, comprising: a mounting portion having at least first and second juxtaposed clamps for receiving respective conduits, each clamp comprising clamping limb portions which are capable of being spread open to receive the respective conduit and the clamps being disposed with a spacing between their mutually adjacent clamping limb portions, said spacing defining a taper opening, the mutually oppositely disposed outermost clamping limb portions of the clamps carrying catch means on their outsides and the outer regions of the clamping limb portions of each clamp being provided at their free end parts with substantially flat outside surfaces which respectively converge in an outward direction; and at least one stirrup portion arranged to extend over said clamps in a pipe clip-closing position and comprising a central web portion and outer limbs which can be resiliently spread apart, each said limb of the stirrup portion having a catch means capable of operative engagement with respective ones of the catch means on the respective clamping limb portions of said clamps for securing said stirrup portion in its pipe clip-closing position by snap engagement, said stirrup portion further comprising adjacent said web portion thereof at least one taper portion which in said pipe clip-closing position of said stirrup portion is engageable between said mutually adjacent clamping limb portions of said clamps, said taper portion being mounted yieldably relative to the stirrup portion in the closing direction thereof whereby in said pipe clip-closing position of said stirrup portion said taper portion engages resiliently into said taper opening between said mutually adjacent clamping limb portions of said clamps and thereby urges them away from each other for gripping respective conduits carried in said clamps, said stirrup portion on its limbs also having contact surfaces which in said pipe clip-closing position are co-operable with said outside surfaces on said clamping limb portions adjacent thereto.

2. A clip according to claim 1 wherein said stirrup portion includes a leaf spring portion which extends from the inside of the stirrup portion in substantially parallel relationship to said web portion thereof, said spring portion carrying said taper portion and in the pipe clip-closing position of said stirrup portion urging said taper portion into the associated taper opening.

3. A clip according to claim 1 wherein the taper angle of said at least one taper portion is in the range of from 10° to 30°.

4. A clip according to claim 1 wherein the taper angle of said at least one taper portion is in in the range of from 19° to 23°.

5. A clip according to claim 2 wherein said at least one taper portion and the associated taper opening is of a geometrical configuration which is associated with the respective spring characteristic of said spring portion, with a ratio in respect of conversion of the force of said spring portion into the conduit-clamping force, which is variable over the depth of penetration of said at least one taper portion into the associated taper opening in such a way that in operation an at least substantially constant clamping force is applied to the clamped conduits irrespective of the conduit diameter tolerance situation of the conduits.

6. A clip according to claim 5 of hard-elastic plastic material and comprising a plurality of mutually adjacent said clamps defining respective said taper openings and a plurality of said taper portions engageable therein, and having the following features:
   (a) each taper opening is defined between flat outside surfaces of said adjoining clamping limb portions and has an aperture angle in the region of 40°;
   (b) the inner ends of said flat outside surfaces merge by way of a respective concave curvature portion and an adjoining convex curvature portion into a respective gap between adjacent ones of said clamps;
   (c) respective tangents at the points of reversal of said mutually opposite curvature portions include an aperture angle in the region of 95°;
   (d) each associated taper portion goes from a projection portion which is narrower than said gap, by way of a concave curvature portion and an adjoining convex curvature portion, into its two taper surfaces which include a taper angle in the region of 22°; and
   (e) tangents at the points of reversal of the last-mentioned mutually opposite curvature portions of feature (d) include an aperture angle in the region of 70°.

7. A clip according to claim 6 wherein said angle of each said taper opening is substantially 40°, said angle between said tangents of each taper opening is substantially 95°, the taper angle of each said taper portion is substantially 22° and said angle between the tangents of each said taper portion is substantially 70°.

8. A clip according to claim 1 wherein in a region which is free of a flat spring portion on its inside, said stirrup portion has a region of reduced wall thickness, which at a spacing at its inside is bridged across by a web portion which is thinner than said region.

9. A clip according to claim 1 wherein at the base of each said clamp said mounting portion has an opening which imparts to the bottom region of each clamp a wall thickness which is at least similar to said outer regions of said clamping limb portions.

10. A clip according to claim 1 wherein at the base of said taper opening, said mounting portion has an opening which imparts to the walls of said adjacent clamping limb portions a wall thickness which is at least similar to said outer regions of said clamping limb portions.

11. A clip according to claim 1 wherein said mounting portion provides an intermediate wall with clamps arranged on respective sides thereof in mirror image relationship with respect to the central plane thereof, and wherein stirrup portions are respectively associated with the arrays of oppositely disposed clamp openings.

12. A clip according to claim 1 which comprises a light metal alloy.

13. A clip according to claim 12 which comprises a magnesium alloy.

14. A clip according to claim 12 wherein the light metal alloy forming same has been subjected to a refining treatment.

15. A clip according to claim 1 and comprising plastic material which is glass fibre-reinforced.

16. A clip according to claim 1 wherein at the outer end of its one limb said stirrup portion is integrally connected to said mounting portion by way of a film hinge.

17. A clip according to claim 11 wherein at the outer end of its one limb each said stirrup portion is integrally connected to said mounting portion by a respective film hinge and wherein said film hinges extend from a common side of the mounting portion.

18. A pipe clip of resilient material for fixing relative to each other at least first and second conduits extending in juxtaposed relationship, comprising:
   a mounting portion having at least first and second juxtaposed clamps for receiving respective conduits, each clamp comprising clamping limb portions which are capable of being spread open to receive the respective conduit, the clamps being disposed with a spacing between their mutually adjacent clamping limb portions, said spacing defining a taper opening, the mutually oppositely disposed outermost clamping limp portions of the clamps carrying catch means on their outsides and the outer regions of the clamping limb portions of each clamp being provided at their free end parts with substantially flat outside surfaces which respectively converge in an outward direction;
   at least one stirrup portion arranged to extend over said clamps in a pipe clip-closing position and comprising a central web portion and outer limbs which can be resiliently spread apart, each said limb of the stirrup portion having a catch means capable of operative engagement with respective ones of the catch means on the respective clamping limb portions of said clamps for securing said stirrup portion in its pipe clip-closing position by snap engagement, said stirrup portion further comprising a leaf spring portion which extends from the inside of the stirrup portion in substantially parallel relationship to said web portion thereof, said spring portion carrying a taper portion adjacent said web portion and in the pipe closing position of said stirrup portion urging said taper portion into the associated taper opening between said mutually adjacent clamping limb portions of said clamps, said taper portion being mounted yieldably on said leaf spring portion relative to the stirrup portion in the closing direction thereof whereby in said pipe clip-closing position of said stirrup portion said taper portion engages resiliently into said taper opening between said mutually adjacent clamping limb portions of said clamps and thereby urges them away from each other for gripping respective conduits carried in said clamps, wherein said at least one taper portion and the associated taper opening is of a geometrical configuration which is associated with the respective spring characteristics of said spring portion, with a ratio in respect of conversion of the force of said spring portion into the conduit-clamping force, which is variable over the depth of penetration of said at least one taper portion into the associated taper opening in such a way that in operation an at least substantially constant clamping force is applied to the clamped conduits irrespective of the conduit diameter tolerance situation of the conduits, said stirrup portion on its limbs also having contact surfaces which in said pipe clip-closing position are co-operable with said outside surfaces on said clamping limb portions adjacent thereto;

said pipe clip being formed of hard-elastic plastic material and comprising a plurality of mutually openings adjacent said clamps defining respective said taper openings and a plurality of said taper portions engageable therein, and having the following features:
(a) each taper opening is defined between flat outside surfaces of said adjoining clamping limb portions and has an aperture angle in the region of 40°;
(b) the inner ends of said flat outside surfaces merge by way of a repsective concave curvature portion and an adjoining convex curvature portion into a respective gap between adjacent ones of said clamps;
(c) respective tangents at the points of reversal of said mutually opposite curvature portions include an aperture angle in the region of 95°;
(d) each associated taper portion goes from a projection portion which is narrower than said gap, by way of a concave curvature portion and an adjoining convex curvature portion, into its two taper surfaces which include a taper angle in the region of 22°; and
(e) tangents at the points of reversal of the last-mentioned mutually opposite curvature portions of feature (d) include an aperture angle in the region of 70°.

19. A clip according to claim 18, wherein said angle of each said taper opening is substantially 40°, said angle between said tangents of each taper opening is substantially 95°, the taper angle of each said taper portion is substantially 22° and said angle between the tangents of each said taper portion is substantially 70°.

* * * * *